United States Patent [19]

Tamekiyo

[11] Patent Number: 5,050,572
[45] Date of Patent: Sep. 24, 1991

[54] SUPERCHARGE PRESSURE CONTROL SYSTEM FOR AUTOMOTIVE ENGINE WITH SUPERCHARGER

[75] Inventor: Masaaki Tamekiyo, Hatsukaichi, Japan

[73] Assignee: Mazda Motor Corporation, Hiroshima, Japan

[21] Appl. No.: 472,557

[22] Filed: Jan. 31, 1990

[30] Foreign Application Priority Data

Jan. 31, 1989 [JP] Japan .................................. 1-19774

[51] Int. Cl.$^5$ ............................................. F02D 23/00
[52] U.S. Cl. ..................................... 123/564; 60/602; 60/611
[58] Field of Search ................. 60/602, 600, 601, 603, 60/611; 123/564

[56] References Cited

U.S. PATENT DOCUMENTS

| | | | |
|---|---|---|---|
| 4,477,875 | 10/1984 | Suzuki et al. | 60/602 |
| 4,646,522 | 3/1987 | Mamiya et al. | 60/611 |
| 4,697,422 | 10/1987 | Veno et al. | 60/602 |
| 4,970,864 | 11/1990 | Kazuo et al. | 60/602 |

Primary Examiner—Leonard E. Smith
Assistant Examiner—Michael I. Kocharov
Attorney, Agent, or Firm—Fleit, Jacobson, Cohn, Price, Holman & Stern

[57] ABSTRACT

A supercharging pressure control system for an automotive engine with a supercharger controlling a pressure of incoming supercharging air into the automotive engine. The pressure of the incoming supercharging air is feedback-controlled so as to reach a target pressure of supercharging air which is determined depending upon engine operating conditions. A feedback control gain is varied higher when the incoming supercharging air pressure is higher than the target supercharging air pressure when compared to being lower than the target supercharging air pressure.

7 Claims, 10 Drawing Sheets

SUPERCHARGE PRESSURE CONTROL SYSTEM FOR AUTOMOTIVE ENGINE WITH SUPERCHARGER

FIELD OF THE INVENTION

The present invention relates to a control system for an automotive engine with a supercharger for controlling the pressure of incoming supercharging air into cylinders of the automotive engine.

BACKGROUND OF THE INVENTION

Superchargers are used to increase engine horsepower by forcing more air-fuel mixture into cylinders of an automotive engine. A normal engine depends upon the vacuum created by pistons to draw the mixture into the cylinders. The supercharger assists the vacuum by increasing the pressure of the incoming air. One known type of control system for such superchargers has the feature of feedback control to develop the pressure of incoming supercharging air to a predetermined target pressure of supercharging air. Such a supercharge pressure control system is known, for example, from Japanese Unexamined Patent Publication No. 61(1986) - 16240 entitled "Supercharge Pressure Control System For Automotive Engine With Supercharger" laid open Jan. 24, 1986.

In the supercharge pressure control system described in the above publication, the same control gain of feedback control is used independent from whether the pressure of actual or incoming supercharging air is higher or lower than a predetermined target pressure of supercharging air. Generally, the control gain of feedback control is substantially always small for the reason of preventing the automotive engine from hunting over the whole range of engine operating conditions in order to ensure the operating stability of an automotive engine.

One disadvantage associated with an automotive engine utilizing the supercharge pressure control system in which feedback control is always effected with the same control gain is that, when the pressure of incoming supercharging air is higher than the target pressure of supercharging air, the automotive engine is subjected to, and thereby adversely affected in the durability thereof by, a great load for a long time.

SUMMARY OF THE PRESENT INVENTION

It is, therefore, a primary object of the present invention to provide a supercharge pressure control system for an automotive engine in which the pressure of actual or incoming supercharging air is, when higher than a target pressure of supercharging air, quickly lowered to the target pressure of supercharging air so as to prevent the automotive engine from hunting due to the feedback control and, thereby, ensure the durability of the automotive engine.

The above object of the invention is achieved by providing a supercharge pressure control system for an automotive engine with a supercharger for controlling a pressure of actual or incoming supercharging air to a predetermined target pressure of supercharging air in feedback control. The supercharge pressure control system includes a gain control means for varying the control gain of feedback control to be higher when the pressure of incoming supercharging air is higher than the target pressure of supercharging air when compared to being lower than the target pressure of supercharging air.

Because of the variation of the control gain of feedback control according to the pressure of incoming supercharging air, the pressure of incoming supercharging air is, when being high, quickly lowered to the predetermined target pressure of supercharging air, thereby preventing the automotive engine from being subjected to a great load so as to contribute to the engine durability of the automotive engine. Furthermore, when the pressure of incoming supercharging air is lower, the automotive engine is isolated from hunting due to feedback control.

BRIEF DESCRIPTION OF THE DRAWINGS

The above and other objects and features of the present invention will be apparent to those skilled in the art from the following description of a preferred embodiment thereof when taken in conjunction with the appended drawings, in which.

DETAILED DESCRIPTION OF THE PREFERRED EMBODIMENT

Figure 1:
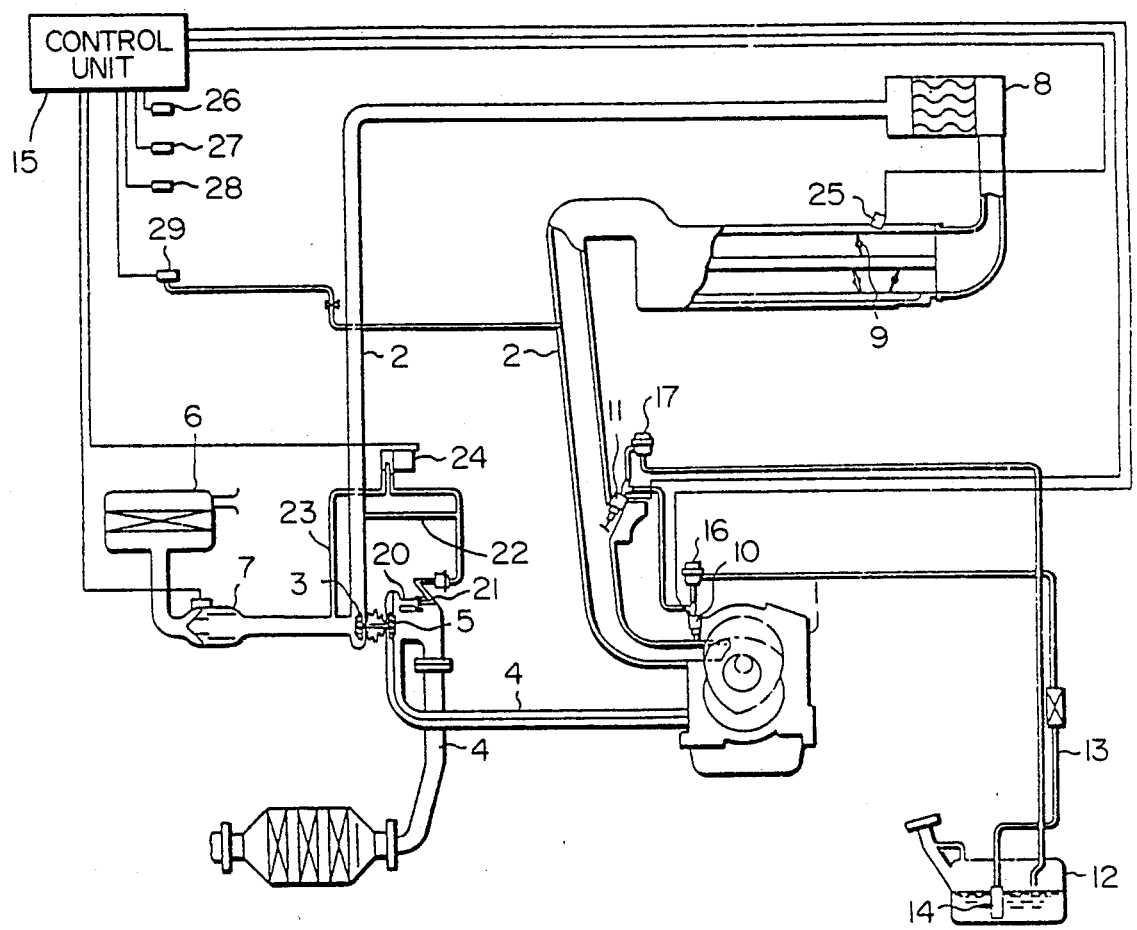
FIG. 1 is a schematic diagram illustrating an automotive engine cooperating with a supercharge pressure control system in accordance with a preferred embodiment of the present invention.

Referring now to the drawings in detail, particularly to FIG. 1, a supercharge pressure control system for an automotive engine with a supercharger, cooperating, for example, with a rotary engine generally designated by a numeral 1, in accordance with a preferred embodiment of the present invention is shown. The rotary engine 1 has an intake pipe 2 with a blower 3 disposed therein and an exhaust pipe 4 with a turbine 5 disposed therein. The intake pipe 2 is provided with an air cleaner 6 and a air flow meter 7 disposed upstream from the blower 3 in order and an intercooler 8, a throttle valve 9 and primary and secondary fuel injection nozzles 10 and 11 disposed downstream from the blower 3 in order. These primary and secondary fuel injection nozzles 10 and 11 are connected to a fuel tank 12 through a fuel pipe 13 to deliver fuel into the intake pipe 2, and hence to the rotary engine 1, by a fuel pump 14. The fuel pipe 13 is provided with a damper 16 for preventing pulsations of the fuel and a pressure regulator 17 for regulating the pressure of the fuel to a desired pressure.

The exhaust pipe 4 is provided with a bypass pipe 20 for allowing partly exhaust gas in the exhaust pipe 4 to flow bypassing the turbine 5 from the upstream to the downstream of the turbine 5. The bypass pipe 20 is provided with a waste gate valve 21 of a diaphragm valve-type well known per se, which waste gate valve 21 varies the cross sectional area of the bypass pipe 20, thereby varying the amount of exhaust gas flowing through the bypass pipe 20 so as to control the pressure of incoming supercharging air. The waste gate valve 21 is accompanied with a pressure line 22 connected to its pressure chamber (not shown) for taking out the intake air downstream from the blower 3 in the intake pipe 2 as supercharging air. The pressure line 22 is connected to one end of a pressure relief line 23 at its one end. The pressure relief line 23 is connected to the intake pipe 2 between the air flow meter 7 and blower 3 at its other end. Provided at the middle of the pressure relief line 23 is a duty solenoid valve 24 which opens and closes the pressure relief line 23.

A control unit 15, mainly comprising a microcomputer, is provided to control time periods for which the primary and secondary fuel injection nozzles 11 and 10 are maintained open, respectively, to deliver fuel therethrough according to the amount of intake air depending upon an output of the air flow meter 7. The control unit 15 also controls a duty rate at which the duty solenoid valve 24 operates to relieve pressure in the pressure line 22, thereby controlling the pressure acting on the pressure chamber of the waste gate valve 21 so as to regulate the opening of the waste gate valve 21 for supercharging pressure regulation.

The control unit 15, which is connected to outputs of throttle opening sensor 25, atmospheric pressure sensor 26, engine speed sensor 27, a mileage sensor 28 and a manifold pressure sensor 29, calculates a desired or target pressure of supercharging air according to operating conditions of the rotary engine 1 depending upon the outputs from the various meters and sensors 25-29 and regulates a pressure of actual or incoming supercharging air to the target pressure of supercharging air according to the output of the manifold pressure sensor 29 in feedback control.

Figure 2:
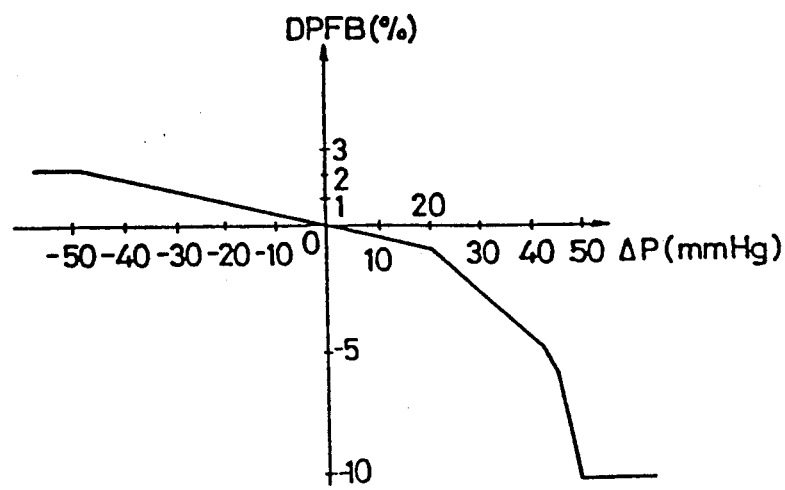
FIG. 2 is a graph for the use of varying a control gain of feedback control in the supercharge pressure control system of FIG. 1.

To provide feedback control on the supercharge pressure control system, the control unit 15 stores data of a feedback gain control map shown in FIG. 2 wherein the axes of abscissas and ordinates give, respectively, the difference $\Delta P(mmHg)$ of the pressure of incoming supercharging air from the target pressure of supercharging air and the control gain DPFB(%) of feedback control. As is apparent from the feedback gain control map shown in FIG. 2, the higher the pressure difference $\Delta P$ becomes, the lower is the control gain DPFB of feedback control to be set. According to the feedback gain control, when the pressure of incoming supercharging air is higher than the target pressure of supercharging air, the supercharge pressure control system quickly lowers the pressure of incoming supercharging air to the target pressure of supercharging air.

Figure 3:
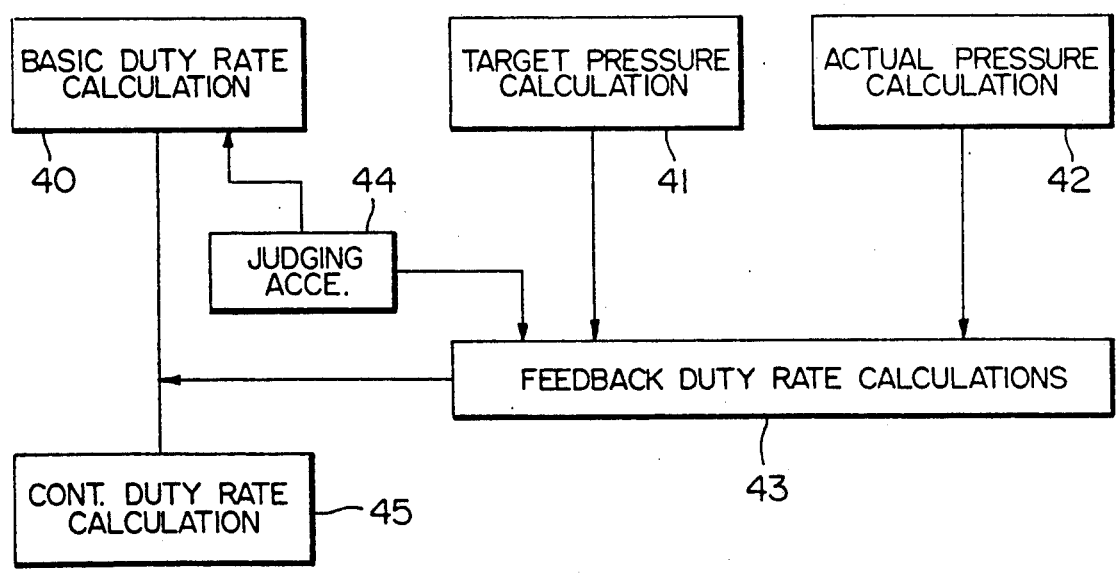
FIG. 3 is a schematic functional block diagram conceptually explaining the supercharge pressure control system of FIG. 1.

Reference is made to FIG. 3 for the easy understanding of the determination of duty rate at which the duty solenoid valve 24 operates by the supercharge pressure control system according to the preferred embodiment of the present invention depicted in FIG. 1. The control unit 15 functionally comprises a basic duty rate calculation section 40 and a target supercharging pressure calculation section 41, both performing a calculation for obtaining a basic duty rate PB and a target supercharging pressure PO based on engine speed and throttle valve opening defined by the outputs from the engine speed sensor 27 and throttle opening sensor 25, respectively, and an incoming supercharging pressure calculation section 42 which calculates the pressure of an incoming supercharging air which is the average value from several detections of the pressure of incoming supercharging air by the manifold pressure sensor 29.

The target supercharge pressure calculation section 41 and actual supercharge pressure calculation section 42 are connected to a feedback duty rate calculation section 43 which calculates a feedback duty rate PFB based on the outputs from the target supercharge pressure calculation section 41 and actual supercharge pressure calculation section 42. Both the basic duty rate calculation section 40 and feedback duty rate calculation section 43 are connected, on one hand, to an acceleration judging section 44 for judging whether the rotary engine 1 is under acceleration in order to correctively change the basic duty rate PB and feedback duty rate PFB when the rotary engine 1 is under acceleration and, on the other hand, to a control duty calculation section 45 for obtaining the sum of the basic duty rate PB and feedback duty rate PFB as a control duty rate PD and, based on the obtained control duty rate PD, outputting a control signal to the duty solenoid valve 24.

The operation of the supercharge pressure control system depicted in FIG. 1 is best understood by reviewing FIGS. 4, 8, 13 and 14, which are flow charts illustrating various routines for the microcomputer of the control unit 15. Programming a computer is a skill well understood in the art. The following description is written to enable a programmer having ordinary skill in the art to prepare an appropriate program for the microcomputer of the control unit 15. The particular details of any such program would of course depend upon the architecture of the particular computer selection.

Figure 4:
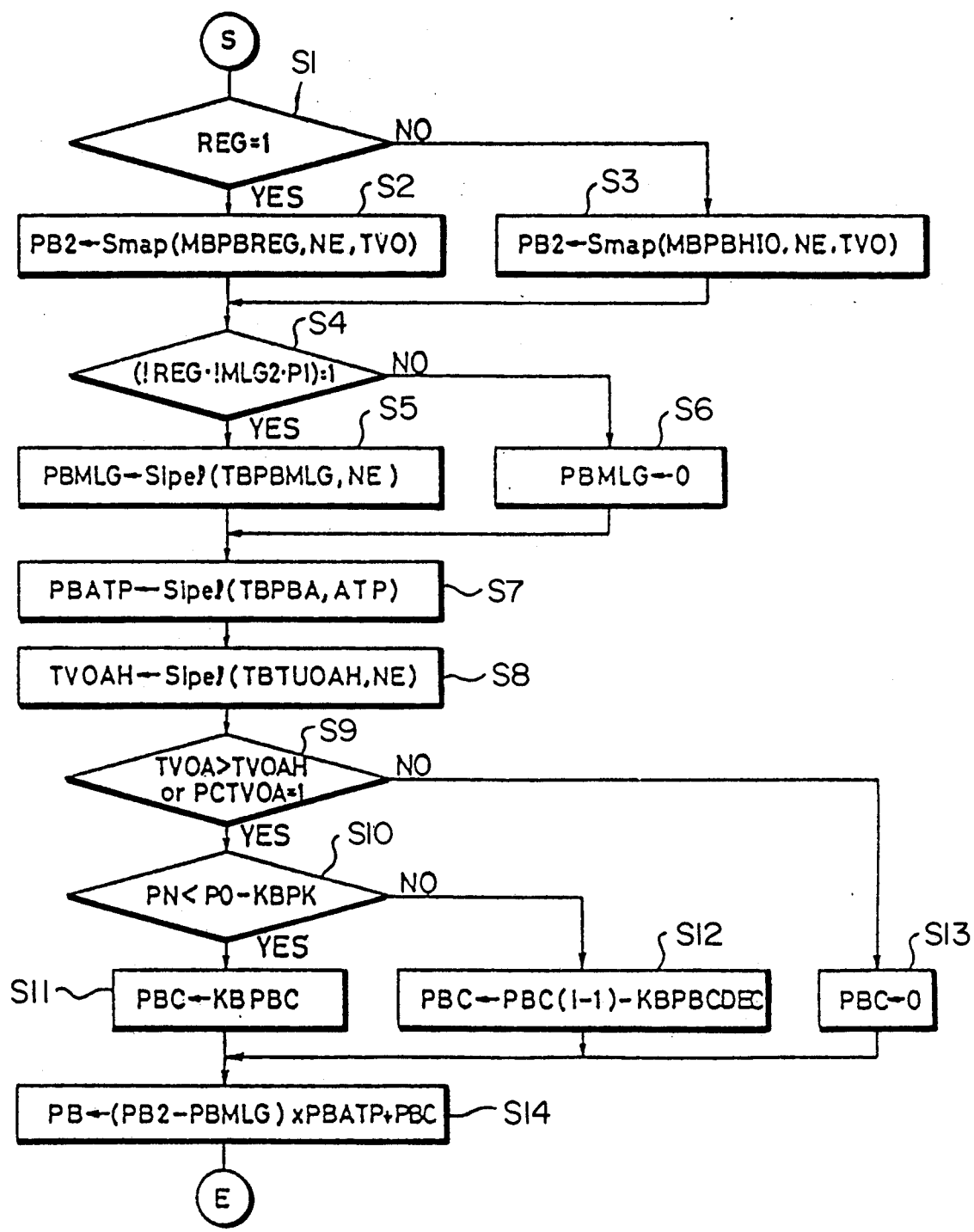
FIG. 4 is a flow chart illustrating a base duty rate calculation routine for a microcomputer of the supercharge pressure control system of FIG. 1.

Referring first to FIG. 4, which is a flow chart of the basic duty rate calculation routine taken in the basic duty rat calculation section 40, the first step S1 is to read a fuel flag REG to decide whether or not a fuel used is regular gasoline or gasoline having a grade assigned an octane rating lower than premium or high octane gasoline. The fuel flag REG=1 as used hereafter shall refer to regular gasoline having a grade assigned a relatively low octane rating. If the answer to the first decision is yes, indicating that the fuel used is a regular gasoline, then, a base duty rate PB2 is calculated from a secondary interpolation table or map MBPBREG for regular gasolines taking engine speed NE and throttle valve opening TVO as parameters in step S2. If the answer to the first decision is no, indicating that the fuel used is a high octane rating gasoline or other than regular gasoline, then, a base duty rate PB2 is calculated from another secondary interpolation table or map MBPBHIO for high octane rating gasolines taking engine speed NE and throttle valve opening TVO as parameters in step S3.

Figure 5:
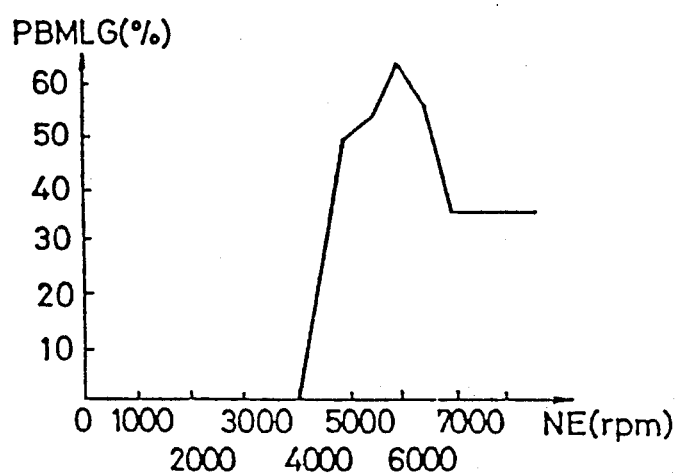
FIG. 5 is a graph showing a mileage correction coefficient relative to engine speed.

After the calculation of the basic duty rate PB2 for either regular gasoline or high octane gasoline, a decision is made in step S4 to decide whether or not the fuel flag and a mileage flag are reset to !REG and !MLG2, respectively, and a manifold pressure flag is set to P1=1. Herein, the mileage flag set to MLG2=1 shall refer to the fact that a mileage detected by the mileage sensor 28 is larger than a predetermined mileage and the manifold pressure flag set to P1=1 shall refer to a pressure detected by the manifold pressure sensor 29 is higher than a predetermined pressure. If the answer to the decision in step S4 is yes, then, a mileage correction coefficient PBMLG is calculated from a linear interpolation table or map TBPBMLG taking engine speed NE as a parameter, such as shown in FIG. 5, in step S5. If the answer is no, then, a mileage correction coefficient PBMLG is set to zero (0) in step S6.

Figure 6:
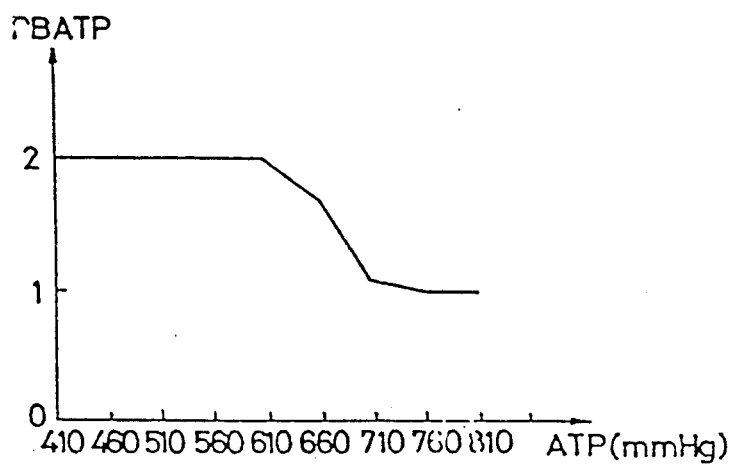
FIG. 6 is a graph showing an atmospheric pressure correction coefficient relative to atmospheric pressure.
Figure 7:
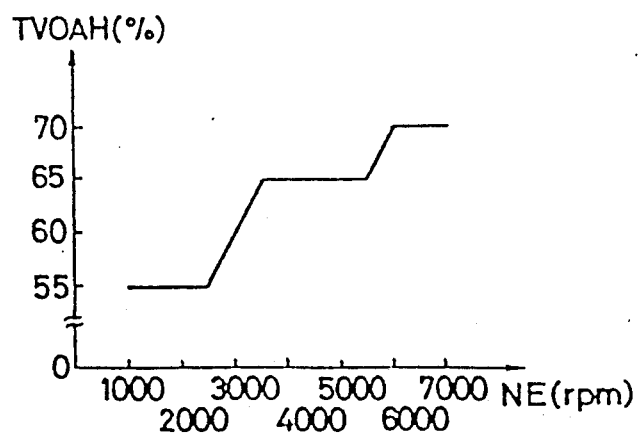
FIG. 7 is a graph showing a throttle valve opening relative to engine speed for the use of judging acceleration.

After the calculating of both an atmospheric pressure correction coefficient PBATP using a linear interpolation table or map taking atmospheric pressure detected by the atmospheric pressure sensor 26 as a parameter, shown as an example in FIG. 6, in step S7 and a critical throttle opening TVOAH for judging the state of acceleration using a linear interpolation table or map TBTVOAH taking engine speed NE as a parameter, shown as an example in FIG. 7, in step S8, a decision is made in step S9 to decide whether or not the rotary engine 1 is under acceleration by judging that an actual throttle valve opening TVOA is larger than the critical throttle valve opening TVOAH or an acceleration flag has been set to PCTVOA=1. If in fact the acceleration flag has been set to PCTVOA=1 or the actual throttle valve opening TVOA is larger than the critical throttle valve opening TVOAH, then, a further decision is made in step S10 regarding whether or not the pressure of incoming supercharging air PN detected by the supercharge pressure sensor 29 is smaller than the difference of the target pressure of supercharging air PO from a predetermined pressure KBPK. If the answer to the decision in step S10 is yes, the acceleration correction coefficient PBC is set to a predetermined acceleration correction constant KBPBC in step S11. On the other hand, if the answer is no, the acceleration correction coefficient PBC is set equal to the difference of the last acceleration correction coefficient PCB(i−1) from an acceleration correction constant KBPBCDEC in step S12. This is for the reason of taking a damping processing. On the other hand, if the answer to the decision in step S9 is no, indicating that the rotary engine 1 is not under acceleration, then, the acceleration correction coefficient PBC is set to zero (0) in step S13. After all, a basic duty rate PB is calculated, in step S14, from the following equation:

$$PB = (PB2 - PBMLG) \times PBATP + PBC$$

Thus, the basic duty rate calculation routine is completed and goes to end.

Figure 8:
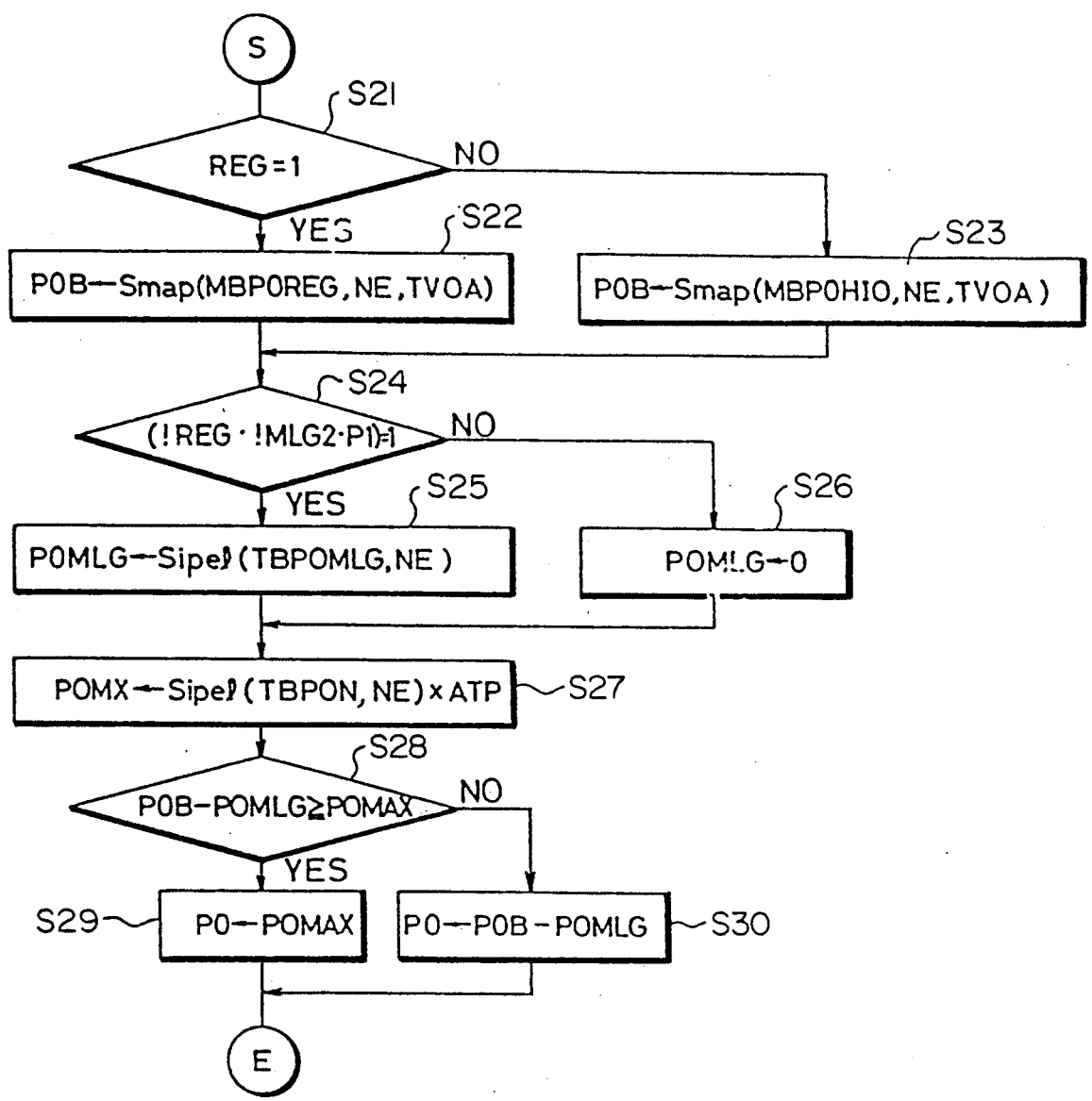
FIG. 8 is a flow chart illustrating a target supercharging pressure calculation routine for the microcomputer.
Figure 9:
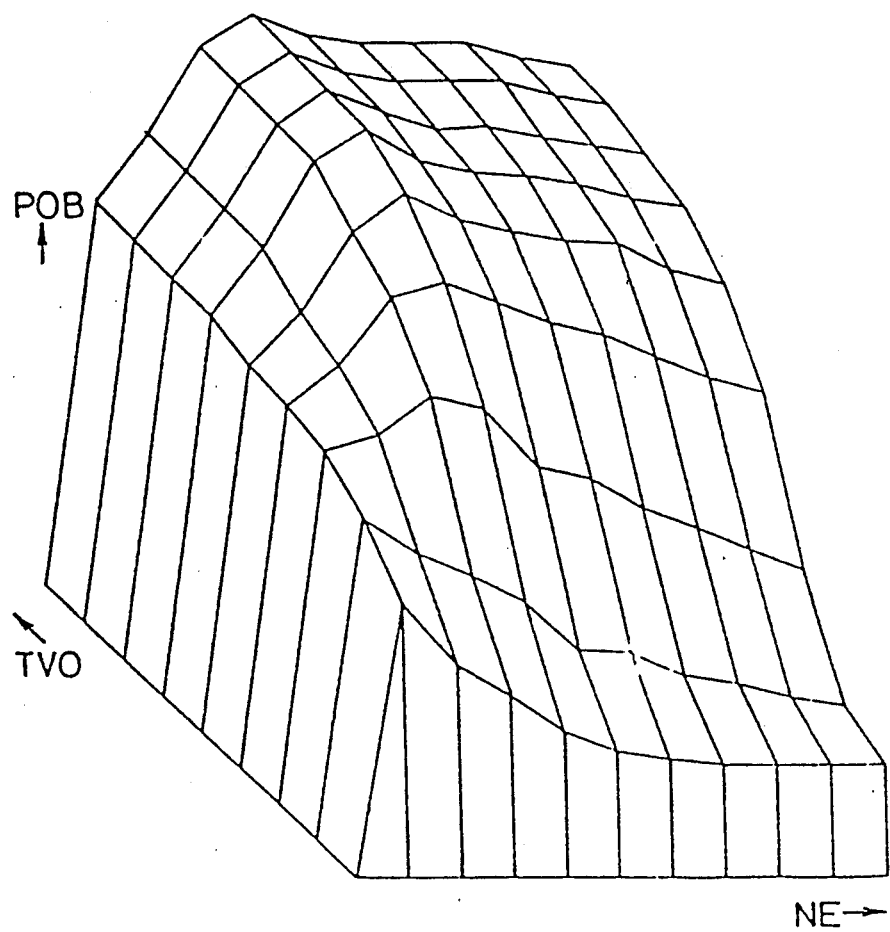
FIG. 9 is a graph for the use of determining a target pressure of supercharging air.
Figure 10:
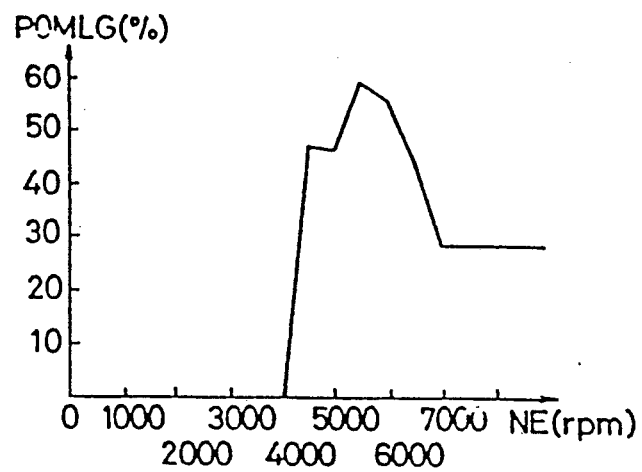
FIG. 10 is a graph showing a mileage correction coefficient relative to engine speed for the use of calculating the target pressure of supercharging air.

FIG. 8 shows a flow chart of the target supercharge pressure calculation routine taken in the target supercharge pressure calculation section 41, the first step S21 is to read the fuel flag to decide whether it has been set to REG=1 indicating the fuel used is a regular gasoline. If the answer to the decision is yes indicating that the fuel is a regular gasoline having a grade of relatively low octane rating, a basic target pressure of supercharging air POB for regular gasoline is calculated in step S22 using a target supercharge pressure table or map MBPOREG in the form of a secondary interpolation map taking engine speed NE and throttle valve opening TVOA as parameters. If, on the other hand, the answer to the decision regarding the grade of gasoline is no, indicating that the fuel used is a high octane rating gasoline or a gasoline other than regular gasoline, then, a basic target pressure of supercharging air POB for high octane rating gasolines is calculated in step S23 using a target supercharge pressure table or map MBPOHIO in the form of a secondary interpolation map taking engine speed NE and throttle valve opening TVOA as parameters. The calculating of the basic target pressure of supercharging air POB for regular gasolines or high octane rating gasolines is performed by the use of a basic target supercharge pressure table or map shown as an example in FIG. 9.

After the calculation of the basic target pressure of supercharging air POB, a decision is made in step S24 to decide whether or not the fuel flag and mileage flag are reset to !REG and !MLG2, respectively, and the manifold pressure flag is set to P1=1. If the answer to the decision in step S24 is yes, then, a milage correction coefficient POMLG is calculated from a linear interpolation table or map TBPOMLG which takes engine speed NE as a parameter, such as shown in FIG. 8, in step S25. If the answer is no, then, the mileage correction coefficient POMLG is set to zero (0) in step S26.

Figure 11:
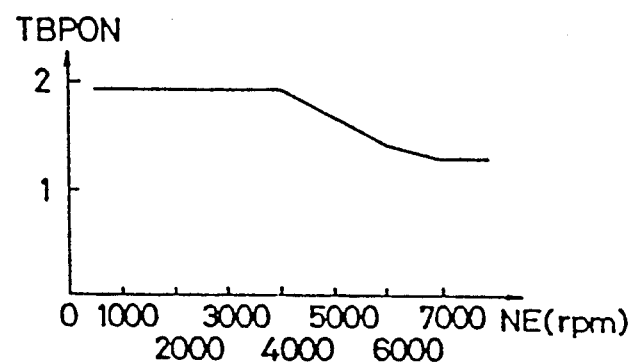
FIG. 11 is a graph showing a maximum guard coefficient relative to engine speed for the use of calculating the target pressure of supercharging air.
Figure 12:
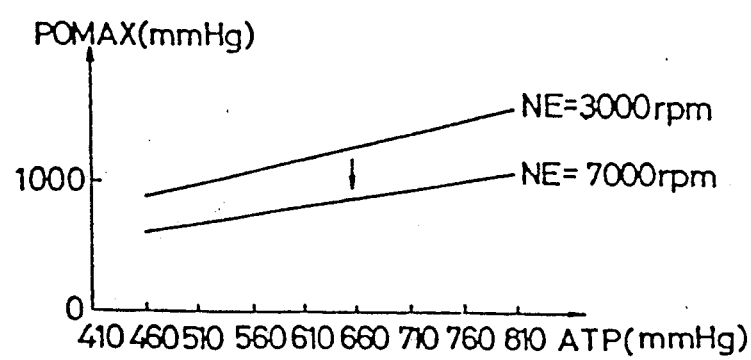
FIG. 12 is a graph showing a maximum guard value of duty rate relative to atmospheric pressure for the use of calculating the target pressure of supercharging air.

After the calculating of a corrected maximum guard pressure of supercharging air by multiplying a maximum guard pressure of supercharging air POMAX determined according to atmospheric pressure ATP from a table or map shown in FIG. 12 by a correction coefficient PBATP determined by the use of a linear interpolation table or map taking engine speed NE detected by the engine speed sensor 27 as a parameter, shown as an example in FIG. 11, in step S27, another decision is made in step S28 to decide whether or not the maximum guard pressure of supercharging air POMAX is equal to or lower than the difference of the basic target pressure of supercharging air POB from the mileage correction coefficient POMLG. Finally, the maximum guard pressure of supercharging air POMAX is set, if the answer to the decision in step S28 is yes, equal to the target pressure of supercharging air PO in step S29 or, if the answer to the decision in step S28 is no, equal to the resultant difference of the basic target pressure of supercharging air POB from the mileage correction coefficient POMLG in step S30. After the setting of the target pressure of supercharging air PO in step S29 or S30, the target pressure calculation routine goes to end.

A pressure of actually incoming supercharging air PN is simply given as an average value of manifold pressure P from the last four detections by the manifold pressures sensor 29 in the incoming supercharge pressure calculation section 42 and calculated from the following equation:

$$PN = [P(i-3) + P(i-2) + P(i-1) + P(i)]/4$$

Figure 13:
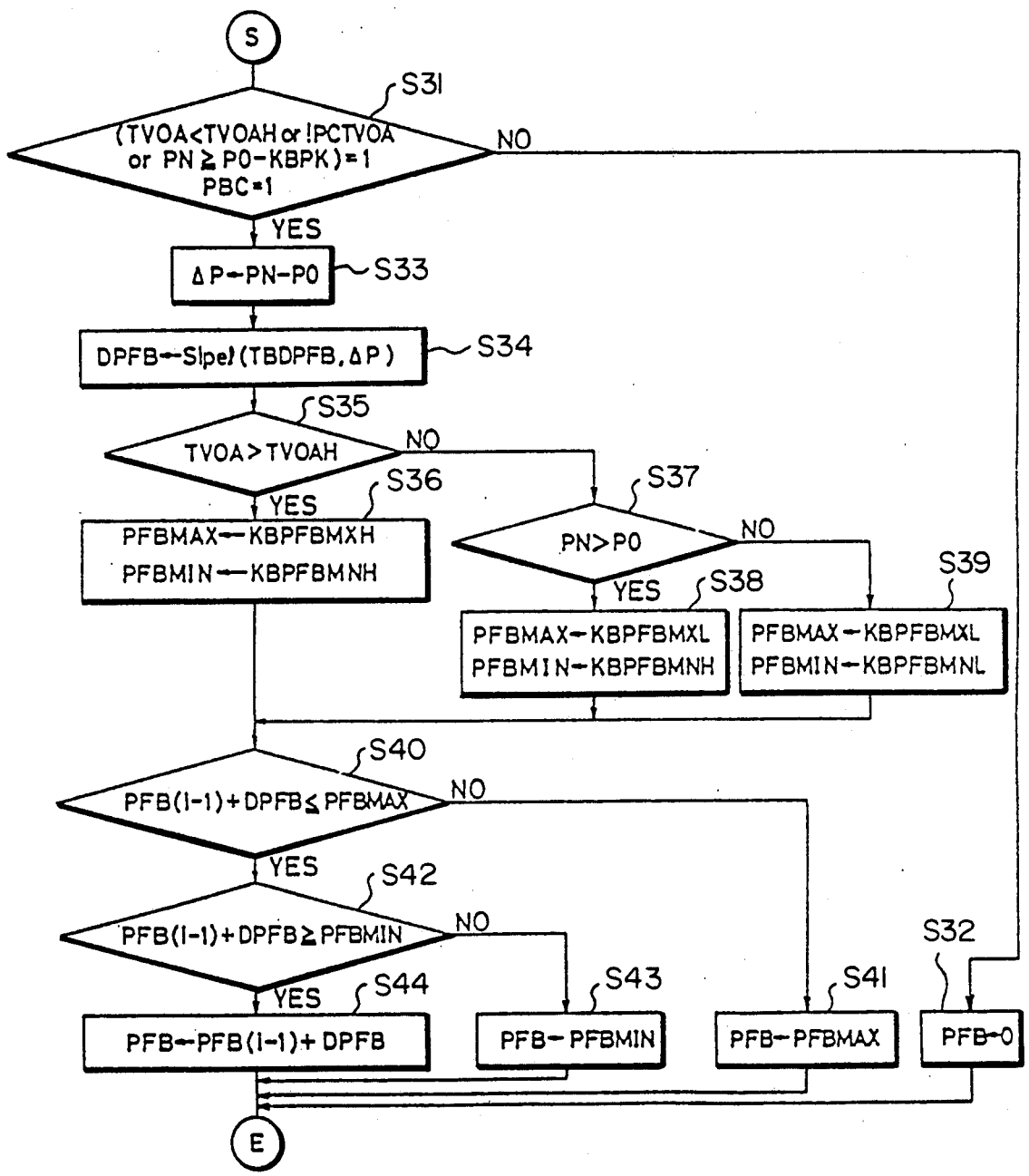
FIG. 13 is a flow chart illustrating a feedback duty rate calculation routine for the microcomputer.

FIG. 13 shows a flow chart of the feedback duty rate calculation routine taken in the feedback duty rate calculation section 43, the first step S31 is to decide whether or not the actual throttle valve opening TVOA is smaller than the critical throttle valve opening TVOAH; the acceleration flag is reset to !PCTVOA; or the pressure of actually incoming supercharging air PN detected by the supercharge pressure sensor 29 is equal to or larger than the difference of the target pressure of supercharging air PO from the predetermined pressure KBPK; and the acceleration correction coefficient PBC is one (1). The first three decisions in step S31 are made whether or not the rotary engine 1 is under acceleration. If either of the answers to all of the first three decisions regarding acceleration is no or if the answer to at last the last decision regarding acceleration correction coefficient is no, then, the feedback duty rate PFB is set to zero (0) in step S32 and thereafter, the feedback duty rate calculation routine goes to end.

If, however, both the answers to any of the first three decisions regarding acceleration and to the last decision regarding acceleration correction coefficient are yes, then, after the calculating of the pressure difference ΔP of the pressure of actually incoming supercharging air PN from the target pressure of supercharging air PO in step S33, a control gain DPFB of feedback control is withdrawn from a linear interpolation table or map TBDPFB taking supercharge pressure difference ΔP as a parameter in step S34.

Thereafter, a decision is made to judge whether or not the actual throttle valve opening TVOA is larger than the critical throttle valve opening TVOAH in step S35. If the answer to the decision is yes, then, maximum and minimum guard values PFBMAX and PFBMIN for respectively defining upper and lower limits of feedback duty rate PFB are set to constants KBPFBMXH and KBPFBMNH, respectively, which have relatively large values, such as +30% and −30%, respectively, in step S36. If, on the other hand, the answer to the decision in step S35 is no, then, a decision is made to judge whether or not the pressure of actually incoming supercharging air PN is higher than the target pressure of supercharging air PO in step S37. If the answer to the decision indicates that the pressure of actually incoming supercharging air PN is higher than the target pressure of supercharging air PO, then, the maximum guard value PFBMAX is set to a constant KBPFBMXH which has a relatively small value, such as +10%, and, on the other hand, the minimum guard value PFBMIN is set to a constant KBPFBMNH which has a relatively large value, such as −30%, in step S38. This is because, the engine reliability is secured by securing the limits of controllable drop in supercharging pressure even if the pressure of actually supercharging air PN is higher than the target pressure of supercharging air PO when the actual throttle valve opening TVOA is small. If the answer to the decision in step S37 is no, then, the maximum and minimum guard values PFBMAX and PFBMIN of feedback duty rate PFB are set to constants KBPFBMXH and KBPFBMNH, respectively, both having relatively small values, such as +10% and −10%, respectively, in step S39.

In any event, after the setting of the maximum and minimum guard values PFBMAX and PFBMIN of feedback duty rate PFB in step S36, S38 or S39, a decision is made in step S40 to judge whether or not the present feedback duty rate PFB, which is that calculated as the sum of the last feedback duty rate PFB(i−1) and feedback control gain DPFB, is equal to or smaller than the maximum guard value PFBMAX set in step S36, S38 or S39. If the answer to the decision indicates that the present feedback duty rate PFB is larger than the maximum guard value PFBMAX, then, the present feedback duty rate PFB is set to the maximum guard value PFBMAX in step S41 and, thereafter, the feedback duty late calculation routine goes to end. If, however, the answer to the decision is yes, indicating that the present feedback duty rate PFB is equal to or smaller than the maximum guard value PFBMAX, a decision is further made in step S42 to judge whether or not the present feedback duty rate PFB is equal to or larger than the minimum guard value PFBMIN set in step S36, S38 or S39.

As a result of the decision in step S42, the present feedback duty rate PFB is set either to the minimum guard value PFBMIN in step S43 if the answer to the decision in step S42 is no, or to the sum of the last feedback duty rate PFB(i−1) and feedback control gain DPFB if the answer to the decision is yes. After the setting of the present duty feedback duty rate PFB in step S43 or S44, the feedback duty rate calculation routine goes to end.

Figure 14:
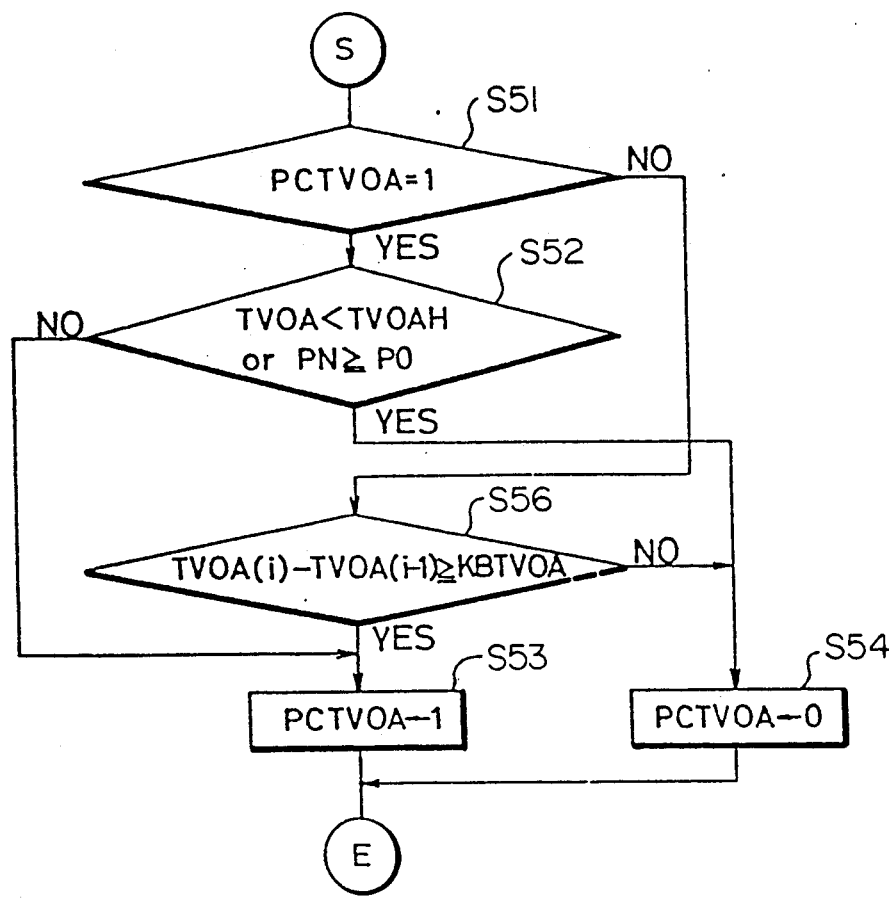
FIG. 14 is a flow chart illustrating an acceleration judging routine for the microcomputer.

FIG. 14 is a flow chart of the acceleration judging routine taken in the acceleration judging section 44, the first step S51 is to decide whether or not the acceleration flag has been set to PCTVOA=1 which indicates the state that the rotary engine 1 is under acceleration. If the answer to the first decision is yes, another decision is made in step S52 to judge whether or not the actual throttle valve opening TVOA is smaller than the critical throttle valve opening TVOAH or the actual supercharge pressure PN is equal to or higher than the target supercharge pressure PO. If the answer to the decision indicates that the actual throttle valve opening TVOA is equal to or larger than the critical throttle valve opening TVOAH and the pressure of actually incoming supercharging air PN is lower than the target supercharge pressure PO, then, the acceleration flag is set to PCTVOA=1 in step S53. If, on the other hand, the answer to the decision indicates that the actual throttle valve opening TVOAH is lower than the critical throttle valve opening TVOAH or the pressure of actually incoming supercharging air PN is equal to or higher than the target supercharge pressure PO, then, the acceleration flag is reset to PCTVOA=0 in step S54.

Returning to step S51, if the answer to the decision regarding the state of acceleration is no, then, another decision is made in step S56 to judge whether or not the difference of the present throttle valve opening TVOA(i) from the last throttle valve opening TVOA(i−1) is equal to or larger than a predetermined value KBTVOA. As a result of the other decision, the acceleration flag is set to PCTVOA=1 in step S53 if the answer is no or is reset to PCTVOA=0 in step S54 if the answer is yes in step S54.

In any event, after the setting or resetting the acceleration flag in step S53 or S54, the routine goes to end.

Figure 15:
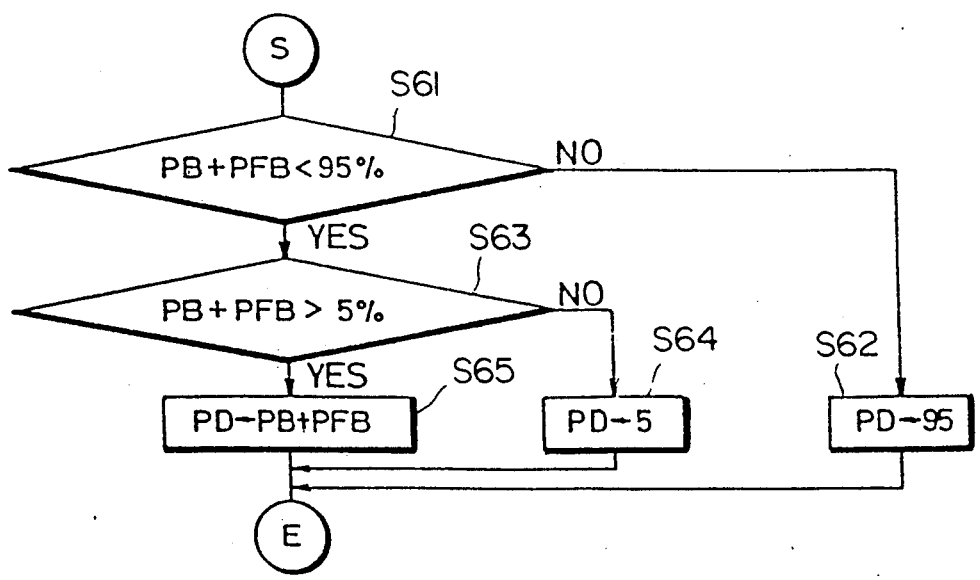
FIG. 15 is a flow chart illustrating a control duty rate calculation routine for the microcomputer.

Referring finally to FIG. 15, which is a flow chart of the control duty rate calculation routine taken in the control duty calculation section 45, the control duty rate PD, which has a value of the sum of the basic duty rate PB and feedback duty rate PFB, is judged in step S61 and S63 in order whether or not it is between allowable extremities, such as, between 5 and 95%. This is because, the control duty rate PD larger than 95% or smaller than 5% is undesirable for precisely operating the duty solenoid valve 24 so as to regulate supercharge pressure. That is, the control duty rate PD is set to 95% in step S62 if the sum of the basic duty rate PB and feedback duty rate PFB is judged to be over 95% in step S61 or is set to 5% in step S64 if the sum of the basic duty rate PB and feedback duty rate PFB is judged to be smaller than 95% in step S61 and further smaller than 5% in step S63. If, however, the sum of the basic duty rate PB and feedback duty rate PFB is judged to be between 5 and 95% in step S61 and S63, then, the sum of the basic duty rate PB and feedback duty rate PFB is remained as the control duty rate PD in step S65. After the setting of the control duty rate PD, the routine goes to end.

Figure 16:
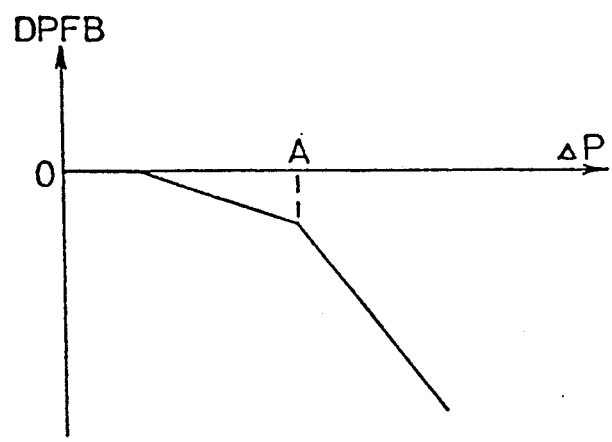
FIG. 16 is another graph, similar to the graph of FIG. 2, for the use of varying a control gain of feedback control used in the supercharge pressure control system of FIG. 1.

Various manners may be alternately taken in place of controlling the control gain DPFB of feedback control by using a feedback control gain map such as shown in FIG. 2. For example, as is shown in FIG. 16, when the pressure difference ΔP between the actual supercharge pressure PN and target supercharge pressure PO exceeds a predetermined critical pressure A, the control gain DPFB of feedback control may be altered in such a way that the result of integration of the control gain DPFB becomes large.

Otherwise, when an acceleration, wherein the target supercharge pressure takes a decrease, is caused, the control gain DPFB of feedback control may be altered in such a way that the result of integration of the control gain DPFB becomes large with the increase of acceleration.

Figure 17:
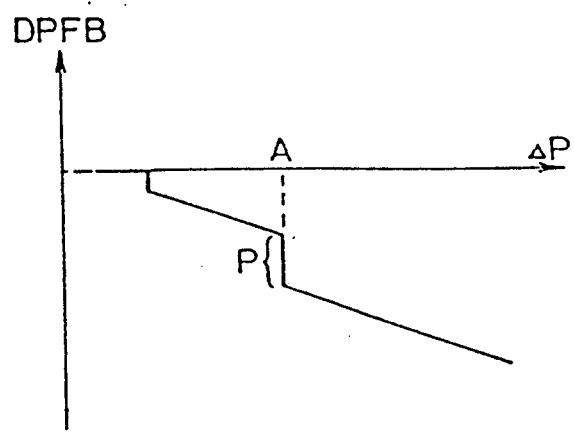
FIG. 17 is still another graph, similar to the graph of FIG. 2, for the use of varying a control gain of feedback control used in the supercharge pressure control system of FIG. 1.

Furthermore, as is shown in FIG. 17, when the pressure difference ΔP between the actual supercharge pressure PN and target supercharge pressure PO exceeds the predetermined critical pressure A, a characteristic curve of the control gain DPFB of feedback control may shift by a shift value P at a point of the predetermined critical pressure A. The shift value P is desirable to change according to the increase of acceleration.

Although the present invention has been fully described by way of the preferred embodiment thereof with reference to the accompanying drawings, it is to be noted that various changes and modifications are apparent to those skilled in the art. Therefore, unless otherwise such changes and modifications depart from the true scope and spirit of the present invention, they should be construed as included therein.

What is claimed is:

1. A supercharging pressure control system for an automotive engine with a supercharger for controlling a supercharging pressure into the automotive engine, said supercharge pressure control system comprising:

control means for controlling a pressure of incoming supercharging air into the automotive engine;

feedback control means for feedback-controlling said pressure of incoming supercharging air to a target pressure of supercharging air predetermined depending upon engine operating conditions; and gain control means for varying a control gain of said feedback control means higher when said pressure of incoming supercharging air is higher than said target pressure of supercharging air when compared to said pressure of said incoming supercharging air being lower than said target pressure of supercharging air.

2. A supercharging pressure control system as defined in claim 1, wherein said control means comprises a supercharging air relief passage connecting an intake and an exhaust passage of said automotive engine and a duty solenoid valve disposed in said supercharging air relief passage which operates at a duty rate to open and close said supercharging air relief passage, thereby controlling said pressure of supercharging air into said automotive engine.

3. A supercharging pressure control system as defined in claim 2, wherein said gain is determined according to a difference between said pressure of incoming supercharging air and target pressure of supercharging air.

4. A supercharging pressure control system as defined in claim 2, wherein said feedback control means controls said duty rate at which said duty solenoid valve operates.

5. A supercharging pressure control system as defined in claim 2, wherein said target pressure of supercharging air is determined according to engine speed and throttle valve opening.

6. A supercharging pressure control system as defined in claim 2, wherein said pressure of incoming supercharging air is determined as an average pressure from a predetermined number of detections of incoming supercharging air.

7. A supercharging pressure control system as defined in claim 2, wherein said duty rate is corrected according to an acceleration of said automotive engine.

* * * * *